Patented Oct. 20, 1953

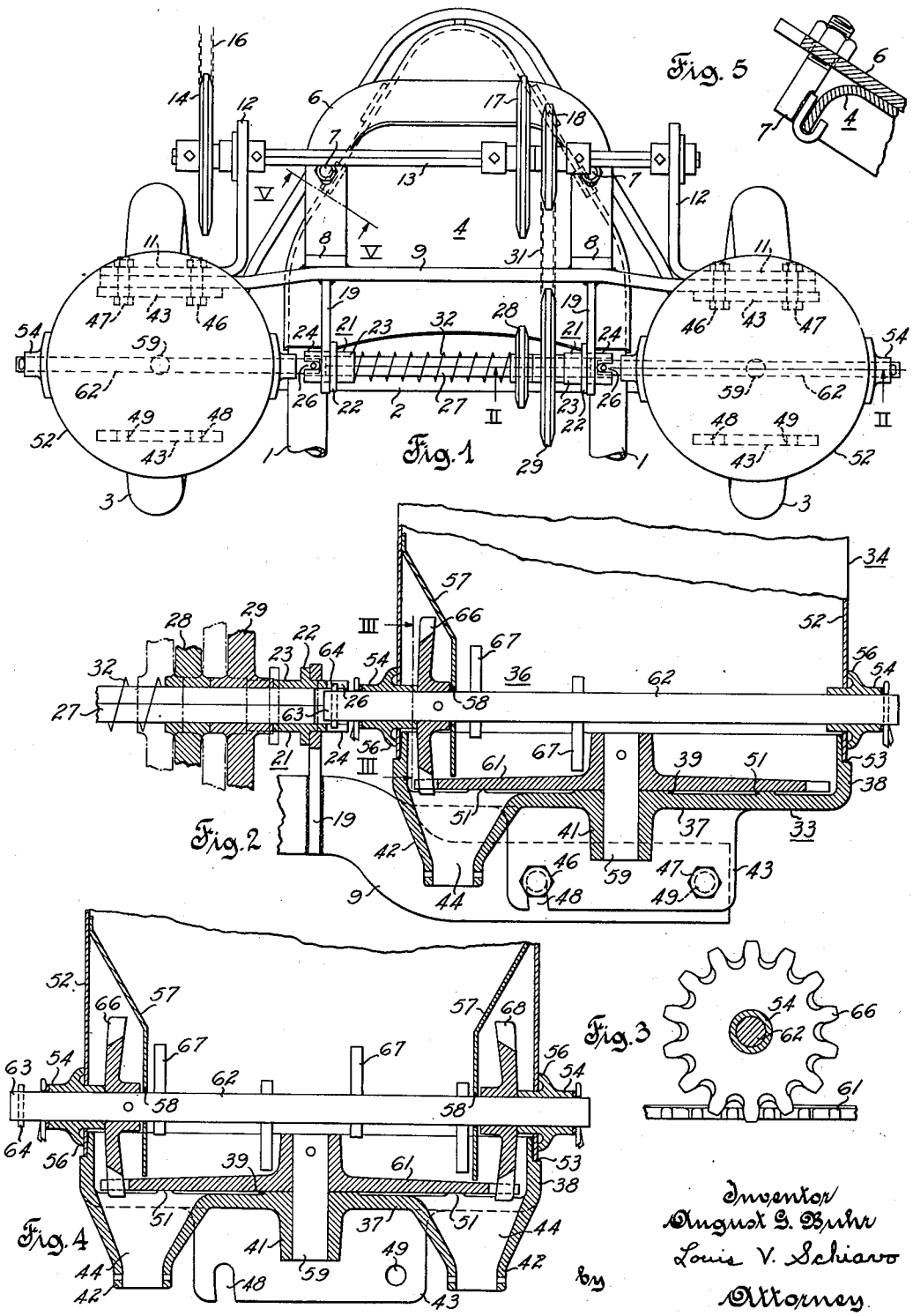

2,656,073

UNITED STATES PATENT OFFICE 2,656,073

FERTILIZER DISPENSING MECHANISM

August G. Buhr, La Crosse, Wis., assignor to Allis-Chalmers Manufacturing Company, Milwaukee, Wis., a corporation of Delaware Application March 26, 1949, Serial No. 83,538

18 Claims. (Cl. 222—164)

This invention relates generally to fertilizer dispensing mechanism and is more particularly concerned with improving features thereof advantageously affecting the care, maintenance, operation and utility of such apparatus.

In general, dry finely divided commercial fertilizers readily absorb moisture and may become hard and lumpy in a matter of hours depending on weather conditions and the nature of the fertilizer. Lumpy fertilizer is conducive to bridging and to a partial or complete clogging of the feeding mechanism thus making it practically impossible to mechanically uniformly distribute such fertilizer, particularly in measured quantities along crop rows during the planting or cultivation thereof. Moreover, in absorbing moisture most of these fertilizers tend to adhere to parts of the dispensing apparatus and therefore further adversely affect operation. Consequently, in order to insure satisfactory operation, it is usually necessary to remove all fertilizer from such apparatus whenever it is to remain idle even for a few hours, and more especially over night. And while the necessity for so removing fertilizer from the dispensing apparatus has long been appreciated, considerable time and effort are required to properly clean the heretofore known designs of such apparatus because of the difficulty of dumping excess fertilizer from the hopper structure and of gaining access to the interior of the hopper and other parts requiring a thorough cleaning. This difficulty tends to discourage users from giving their apparatus proper care and consequently has resulted in an excessive breakage of parts and loss of time.

The texture of finely divided commercial fertilizers varies considerably and is a further factor adversely affecting satisfactory operation of most conventional type dispensers. Furthermore, the utility and effectiveness of the known types of conventional dispensers are additionally adversely affected by a construction and coaction of parts affording one or more of the following: (a) partial gravity feed, since with this type of feed the flow of fertilizer through an opening decreases, irrespective of texture, as the hopper empties; (b) feeding mechanism practically effective only when rotated in one direction, as such operation necessitates the provision of right and left hand hopper assemblies; (c) feed mechanism driven from a shaft mounted below the hopper base, as such a drive necessitates a large gear aperture in the base for establishing a driving connection with the feed plate which results in a considerable leakage of fertilizer through this aperture; and (d) a feed plate mounting requiring the use of special tools, such as a wrench, and removal of additional parts in order to remove this plate for cleaning or replacement purposes.

It is, therefore, a primary object of this invention to provide a fertilizer dispensing apparatus incorporating parts constructed and combined for coaction in an improved manner affording ready removal of excess fertilizer and ready access to and removal of parts requiring a thorough cleaning.

Another object of the present invention is to provide a fertilizer dispensing apparatus with an improved feeding mechanism which is equally effective in either direction of rotation thereby affording maximum utility with a minimum number of parts by eliminating the necessity of providing right and left hand hopper assemblies.

Still another object of this invention is to provide a fertilizer dispensing apparatus with an improved feeding mechanism wherein parts are constructed and combined for coaction in a manner affording a uniform discharge of fertilizer irrespective of its texture and/or irrespective of the head of fertilizer present in the hopper structure.

A further object of the present invention is to provide an improved fertilizer dispensing apparatus which affords a leakproof construction and/or which minimizes machining operations and the time and skill required to assemble and service same.

And accordingly this invention may be considered as comprising the various features of construction and/or combination affording one or more of the above stated and other objects and advantages as hereinafter more particularly pointed out in the following detailed description and appended claims, reference being had to the accompanying drawing of an illustrative apparatus, in which:

Fig. 1 is a partial plan view of tractor mounted fertilizer attachment embodying the invention;

Fig. 2 is an enlarged central vertical section through one of the hopper structures taken on line II—II of Fig. 1;

Fig. 3 is a section taken on line III—III of Fig. 2 with the gear shield removed;

Fig. 4 is a sectional view similar to Fig. 2 showing a modified hopper structure; and Fig. 5 is a view taken on line V—V of Fig. 1.

Referring particularly to Fig. 1, it will be seen that the traveling support or tractor element of the combination includes a frame comprising a pair of laterally spaced tubular frame members 1 extending forward from a wheel supported rear axle structure (not shown). The forward end of this frame is supported on a front axle structure 2, which mounts a pair of laterally spaced ground engaging dirigible wheels 3 on opposite end portions thereof. A rigid plate member 4, generally triangular in shape and having a continuous flange formed on two sides thereof, the third side being unflanged, is rigidly bracingly secured, as by welding, to the frame and is thereby disposed in forward overhanging relation thereto with the unflanged side to the rear, and with opposed rear end portions of said flange extending downward and side abutting the laterally outer sides of frame members 1.

A rigid frame member 6 comprising a flat U-shaped bar is seated upon plate member 4 and is positioned with the closed end thereof forwardly disposed, and with the legs thereof extending rearwardly from the closed end. Opposed intermediate leg portions of frame member 6 overhang plate member 4, and a pair of bolts 7 pass through these portions, depend therefrom alongside the flange of the plate member, and hook under said flange (note Fig. 5) for detachably securing the plate and frame members together. The rear end portions of frame member 6 are turned up to provide laterally aligned portions 8 for supporting another frame member comprising an elongated rigid hopper support bar 9, which is rigidly secured, as by welding, to these end portions and thereby disposed horizontally transversely relative to the direction of travel and in superimposed spaced relation to plate member 4. The opposite end portions of this support bar are disposed generally over dirigible wheels 3 and afford right and left hopper attaching or mounting stations, as viewed when looking in the normal direction of travel.

A pair of similar brackets, each comprising an L-shaped flat bar member having an attaching leg 11 and a shaft supporting leg 12, are disposed with the attaching legs in forward side-abutting relation to the hopper attaching stations, and with the shaft supporting legs projecting forward therefrom in transverse alignment. A shaft 13 is rotatably supported by legs 12 in a conventional manner and thereby disposed in generally parallel forward spaced relation to support bar 9 and with the left end portion thereof overhanging the associated shaft supporting leg. This left end portion drivingly mounts a chain sprocket 14, which has a chain 16 trained thereover. Chain sprockets 17 and 18, having large and small pitch diameters, respectively, are mounted alongside one another on an intermediate portion of this shaft for rotation therewith and are secured in a conventional manner against movement along the longitudinal axis thereof.

A pair of similar plate brackets 19 are terminally rigidly secured to spaced intermediate portions of support bar 9 and are thereby disposed to extend vertically rearwardly therefrom between the hopper attaching stations and in parallel symmetrical relation relative to the longitudinal axis of the tractor, and a pair of similar couplings or bearings 21, each comprising a cylindrically shaped member having a continuous outwardly projecting shoulder 22 formed about an intermediate portion thereof and a square shaft receiving opening on the central axis thereof, are mounted in brackets 19 for rotation therein and sliding movement relative thereto. The bearings are disposed in axial alignment and normally with shoulders 22 side abutting the laterally inner sides of brackets 19 so that the inner end portion 23 and the outer end portion 24 of each bearing overhang the bracket associated therewith. Each outer end portion 24 is provided with a pair of similar pin receiving openings 26, which are diametrically opposed to one another and open on said end. A square shaft 27 is supported in these bearings and is disposed thereby generally in parallel rearward spaced relation to support bar 9, the bearings being slidable on this shaft and rotatable therewith. It will be observed that the length of shaft 27 is the same as the spacing of brackets 19, and that normally only inner end portions 23 of the bearings are engaged thereby. Chain sprockets 28 and 29, having small and large pitch diameters, respectively, are mounted on an intermediate portion of shaft 27 for sliding movement along the longitudinal axis thereof and for rotation therewith. These sprockets are mounted alongside one another and adjacent to the bearing 21 which is disposed on the right side of the tractor. In addition, sprockets 28 and 29 are arranged in longitudinal alignment with sprockets 17 and 18, respectively, a chain 31 being trained over sprockets 18 and 29 for rotating bearings 21. A coil compression spring 32 surrounds an intermediate portion of shaft 27 and is seated against sprocket 28 and the bearing 21 disposed on the left side of the tractor.

A hopper assembly comprising a base structure or section 33, a hopper structure 34 and a material feeding mechanism 36 is mounted at each hopper attaching station, and since these assemblies are identical only one will be described in the interest of simplicity. Referring particularly to Fig. 2, which shows a single feed hopper assembly, it will be seen that base section 33 comprises a member having a flat circular bottom 37 and a raised rim 38. A pair of round bosses 39 and 41 are formed integrally with this bottom and are disposed on the central vertical axis thereof to project, respectively, above and below said bottom, and an opening is formed therethrough for receiving and positioning a shaft on the said central vertical axis. A material discharge spout 42 and a pair of similar elongated station attaching flanges 43 are also integrally formed with this bottom, the discharge spout being thereby disposed to depend therefrom with the opening 44 therein adjacent to rim 38, and the attaching flanges being thereby disposed to depend from spaced portions of the bottom in parallel symmetrical relation relative to a line through the center of the bottom and the center of the discharge spout. The outer face of one of the flanges 43 is positioned in rearward side-abutting relation to the associated hopper attaching station, opposite attaching leg 11. Bolts 46 and 47 pass through a laterally inner bolt receiving hole 48 and a laterally outer bolt receiving hole 49, respectively, in said flange, and also through registering bolt receiving holes in the hopper attaching station and in attaching leg 11, these bolts acting to secure these parts together and to position the discharge spout toward the associated bearing 21. The bolts are symmetrically spaced relative to a vertical longitudinal plane through the center of the base section, and it will be observed that bolt receiving holes 48 in said flanges open on the bottom thereof. A rib 51, also integrally formed with bottom 37, projects upward therefrom the same distance as boss 39 and is disposed in concentric spaced relation to rim 38, said rib being continuous except at the portion of the bottom from which the discharge spout depends.

The hopper structure 34 comprises a cylindrical sheet metal hopper body 52 having an open bottom portion which is adapted to removably engage rim 38 and to be seated on a continuous shoulder 53 formed thereabout, and being rigidly detachably secured in any known manner to base section 33 for movement therewith. Diametrically opposed portions of this hopper body have openings therein which receive a pair of similar hopper carried bearings 54. Each bearing 54 has an elongated body and a flange 56 formed about an intermediate portion thereof. These flanges are secured, as by bolts (not shown), to the hopper body and are thereby disposed in side-abutting relation to the exterior surface thereof so that bearings 54 are axially aligned and the opposed ends thereof project into the hopper. A shield plate 57 having a shaft receiving opening 58 therein is secured to the hopper body in any suitable, conventional manner, and is thereby disposed inside said hopper body to form therewith a gear receiving compartment having a bottom portion opening directly over opening 44 of discharge spout 42, and is further disposed with opening 58 in axial alignment with bearings 54.

The material feeding mechanism 36 includes a stub shaft circular feed plate assembly 59 and 61, respectively, the shaft being rotatably removably received by the shaft receiving opening in bottom 37 and thereby positioned on the central vertical axis of this bottom with the feed plate 61 rotatable therewith about the axis afforded by the stub shaft. Feed plate 61 has a toothed periphery and the lower face of this feed plate is seated on boss 39 and on rib 51 for movement thereover in slightly elevated relation to bottom 37. A feeder shaft 62 is carried by hopper bearings 54 and is thereby disposed to pass through opening 58. This feeder shaft is further disposed directly over stub shaft 59, at a right angle thereto, and in axial alignment with shaft 27. In the assembled condition of the parts as shown in Figs. 1 and 2, the hopper attaching flanges or exterior projections 43 at the underside of the hopper base 33 are located at opposite sides, respectively, of a plane extending radially from and in the longitudinal direction of the feeder shaft 62. An end portion 63 of the feeder shaft overhangs the associated hopper bearing and is provided with projecting opposite end portions of a pin 64, which is rigidly secured thereto and thereby disposed at a right angle to the longitudinal axis thereof. End portion 63 is normally received by the associated bearing 21, opposite end portions of pin 64 being positioned to loosely engage openings 26, and it will be observed that this end portion is disposed in slightly spaced relation to the associated bracket 19. A toothed gear 66 is mounted on an intermediate portion of said feeder shaft for rotation therewith and is thereby disposed over discharge spout 42, alongside the associated hopper bearing 54, and within the compartment formed by the hopper body 52 and shield plate 57. The lower edge of the shield plate is elevated relative to bottom 37 so as to allow the toothed periphery of feed plate 61 to pass freely thereunder for meshing with said gear, as shown in Fig. 3, and a plurality of agitator elements, each comprising an elongated rod 67, are detachably secured in any known manner to spaced intermediate portions of feeder shaft 62, and are arranged to rotate therewith for agitating the material in the hopper body.

Referring to Fig. 4, it will be observed that a double feed hopper assembly may be utilized instead of the single feed hopper assembly shown in Fig. 2. Those features wherein the double feed hopper assembly materially differs from the description thus far given for the single feed hopper assembly will be pointed out, and it will be understood that as to other features, the double and the single feed hopper assemblies are identical, and that a further explanation in this connection is deemed unnecessary for a complete understanding of the invention. The construction on the laterally inner side of the double feed hopper assembly includes a shield plate 57, a gear 66, a plurality of agitator elements 67, and a discharge spout 42, all operatively associated with a feed plate 61 in the certain manner hereinbefore described as applying to the single feed hopper assembly. But the double feed hopper assembly differs from the single feed hopper assembly in that this construction is duplicated on the laterally outer side thereof, except that the outer side gear 68 is mounted on feeder shaft 62 for rotation relative thereto, instead of therewith.

It should be apparent that sprocket 14 and chain 16, which derive power from a ground engaging wheel (not shown), are drivingly associated with shaft 13. The chain 31 may be selectively trained over sprockets 18 and 29 (as shown in Fig. 1) or over sprockets 17 and 28 to establish a driving connection between shafts 13 and 27, selection depending upon the rate of feed desired. The shaft 27 is drivingly associated with the feeder shafts 62 through the couplings or bearings 21, which coact with pins 64, and referring particularly to the operation of the single feed hopper assemblies, it should be apparent that since gears 66 rotate with their respective feeder shafts, and since the teeth thereof mesh with the teeth of the associated feed plates 61, the latter rotate about the axes afforded by stub shafts 59. The material in the hopper bodies is agitated by rods 67 as they rotate with the feeder shafts, and that portion of the material which lodges between the teeth of the feed plates is carried to discharge spouts 42, positively dislodged therefrom by the teeth of gears 66, and dropped into openings 44. The material which lodges between the teeth of the feed plates is substantially all that is discharged into openings 44, the bulk of the material being retained by shield plates 57, which separate gears 66 therefrom. But any material which works its way between feed plates 61 and bottoms 37 may be discharged through said openings also. It will be observed that the feed plates are rotatable in either direction, and that the material feeding mechanisms 36 are effective regardless of the direction of rotation. Due to this feature the hopper assemblies may be made alike, and either of them may be removed from one side of the tractor and mounted on the other by simply turning it half way around and utilizing the other one of the attaching flanges 43. It should also be apparent that what has heretofore been said relative to the operation of the single feed hopper assemblies is applicable to the operation of the double feed hopper assemblies. But, referring particularly to Fig. 4, it will be observed that gears 66 and 68 mounted on each feeder shaft 62, one for rotation with the feeder shaft and one for rotation relative thereto, rotate in opposite directions because each meshes with diametrically opposed teeth of a single feed plate 61. Material lodging between the teeth on one side of said feed plate is carried to one discharge spout, and material lodging between the teeth on the other side of said feed plate is carried to the other discharge spout. In other respects this phase of the operatiton of the double feed hopper assemblies and the single feed hopper assemblies are similar, and a further description thereof is deemed unnecessary for a full understanding of the invention.

When it is desired to remove the material from the hopper assembly on the right side of the tractor (whether it is a single feed or double feed hopper assembly), chain 31 is removed from the sprockets establishing a driving connection between shafts 13 and 27, the bolts 46 and 47 are loosened and the driving connection between shaft 27 and feeder shaft 62 is broken by pulling the associated bearing 21 and the hub abutting sprockets 28 and 29 away from the hopper assembly against the force of spring 32 so that the end of this bearing, while still engaged with bracket 19, is in spaced relation to end portion 63, as shown by dot-dash lines in Fig. 2. The hopper assembly is then swung laterally outward about bolt 47 so as to assume an inverted position alongside the right front dirigible wheel 3, and then said bearing is released so that it fully reengages said bracket, as shown by full lines in Figs. 1 and 2. It will be observed that bolt 46 and the flange 43 are disengaged by reason of hole 48, which opens through the bottom of said flange. And in addition, it will be observed that the said inverted position of the hopper assembly permits placing a receptacle (not shown) on the ground alongside the right front dirigible wheel 3 for receiving excess material dumped from the hopper.

Now in order to expose the individual parts of the hopper assembly for thorough cleaning, the hopper structure 34, which is detachably secured in any known manner to the base section 33, is disengaged therefrom and removed, together with feeder shaft 62 carried thereby and the parts mounted on said feeder shaft. When this has been done stub shaft 59 and feed plate 61 carried thereby can then be readily withdrawn from the central opening in base section 33. It should be obvious that all parts of the hopper assembly are thus readily exposed for easy cleaning. After this is accomplished the feed plate and stub shaft, hopper structure and base section are reassembled. Then bearing 21 is again pulled away from the hopper assembly against the force of spring 32 in order to allow the feeder shaft to resume its aligned position with shaft 27 as the hopper assembly is swung laterally inward to its normal upright position, and in order to allow hole 48 of flange 43 to reengage bolt 46. The driving connection between shaft 27 and the feeder shaft is then reestablished by releasing the bearing and allowing openings 26 to move into engagement with pin 64. And finally, bolts 46 and 47 are drawn up tight. When it is desired to remove the material from the hopper assembly on the left side of the tractor, a similar procedure is followed, but in this case it is unnecessary to remove the chain affording a driving connection between shafts 13 and 27.

It should be apparent now that a fertilizer attachment has been provided which facilitates removal of excess material from the hopper assemblies and the thorough cleaning of parts.

No special tools, such as a wrench, are required for removing the feed plate for cleaning or replacement. The apparatus is equally effective in either direction of rotation, making it possible to use the same hopper on either side of the tractor, thus eliminating the necessity for right and left hand hopper assemblies. It will be observed that the feed is in measured quantities and the rate thereof is uniform regardless of the head of fertilizer in the hopper or its texture, and varies only as the rate of travel. And finally, it will be observed that gear apertures in the bottom of the hoppers are eliminated so that a leakproof construction results, which at the same time involves a minimum of machining operations and time and skill for assembling and servicing.

It should be obvious that although the apparatus herein described as embodying the invention has particular utility in the dispensing of fertilizer, certain features are of more general application and that, therefore, it is not intended to limit the invention to the exact construction and combinations herein shown and described for purposes of illustration as various modifications within the scope of the appended claims may occur to persons skilled in the art.

It is claimed and desired to secure by Letters Patent:

1. A mobile fertilizer dispenser for a traveling support presenting a hopper mounting station, a drive shaft disposed transversely relative to the direction of travel with one end thereof terminating adjacent said station, a hopper assembly detachably pivotally secured to said mounting station for selective swinging movement outwardly with respect to said one end of the drive shaft about an axis generally parallel to the direction of travel and into an inverted position, said hopper assembly including a base structure presenting a generally circular interior surface and including a hopper structure associated with said base structure for swinging movement therewith, said interior surface having a material discharge opening through a peripheral portion thereof and having a shaft receiving opening through the center thereof, a circular feed plate having a toothed periphery and having a central stub shaft slidably received in said shaft opening, said feed plate being thus removably supported for rotation over said interior surface about an axis centrally thereof with its toothed periphery controlling said discharge opening, a feeder shaft carried by said hopper structure for rotation about an axis generally at a right angle to the axis of rotation of said feed plate and presenting an exposed exterior end portion disposed in end-opposed coupling relation with respect to said one end of the drive shaft, and a gear fixed to said feeder shaft for rotation therewith in meshed relation to the toothed peripheral portion of said feed plate controlling said discharge opening.

2. A fertilizer attachment for a traveling support comprising a frame securable to such a support and presenting a hopper attaching station, a drive shaft carried by said frame and mounted for rotation with an end thereof disposed adjacent said station, a hopper assembly detachably pivotally secured to said station for swinging movement about an axis generally at a right angle to the longitudinal axis of said drive shaft and being releasably retained in an upright position in proximity to the said adjacent end of the drive shaft, said hopper assembly including a material feeding mechanism comprising a feeder shaft rotatably supported by said hopper assembly and presenting a projecting exterior end portion in proximate axial alignment with respect to the adjacent end of said drive shaft when said hopper assembly is secured in position on said station, a coupling element supported by an adjacent end portion of one of said shafts for rotation therewith and for limited movement axially thereof, said coupling element having a portion slidably engageable with the adjacent end of the other one of said shafts for establishing a driving connection therebetween, and a yieldable means coacting with said coupling element to maintain same in driving engagement with said other shaft.

3. A mobile fertilizer dispenser for a traveling support comprising a hopper mounting station on each side of said support, a hopper assembly detachably pivotally securable to either of said hopper mounting stations for selective swinging movement transversely outwardly about an axis generally parallel to the direction of travel and into an inverted position, said hopper assembly including a base structure presenting a generally circular interior surface and a pair of diametrically opposed spaced exterior station attaching portions symmetrically arranged with respect to the center of said interior surface and including a hopper structure detachably secured to said base structure for movement therewith, said interior surface having a material discharge opening through a peripheral portion thereof approximately midway between said station attaching portions and having a central shaft receiving opening therethrough, a circular feed plate having a spur toothed periphery and having a central stub shaft slidably received in said shaft opening, said feed plate being thus removably supported for rotation over said interior surface about an axis centrally thereof with its toothed periphery controlling said discharge opening, a feeder shaft extending through and rotatably supported by diametrically opposed portions of said hopper structure approximately midway between said station attaching portions on said base structure, and a spur gear fixed to said feeder shaft for rotation therewith in meshed relation to the toothed peripheral portion of said feed plate controlling said discharge opening.

4. A fertilizer attachment for a traveling support comprising an elongated frame positionable on such a support in transverse relation to the direction of travel and presenting a pair of laterally spaced hopper attaching stations, a drive shaft carried by said frame in position between said stations and being mounted for rotation on a generally horizontal axis extending longitudinally of said frame, a hopper assembly including a base structure presenting similar spaced opposed station attaching portions rendering said assembly detachably pivotally securable to either one of said stations in an upright position with the same side of said assembly disposed in proximity to the adjacent end of said drive shaft and with said assembly supported for selective swinging movement outwardly with respect to the adjacent end of said drive shaft about an axis generally parallel to the direction of travel and into an inverted position, said assembly being thus secured to a selected one of said stations and including a hopper structure removably secured to said base structure for movement therewith, said base structure presenting a generally circular interior surface having a central shaft receiving opening therethrough with its axis generally normal to said interior surface and intersecting the longitudinal axis of said drive shaft and having a material discharge opening through a peripheral portion thereof intersected by a plane common to said intersecting axes, a circular feed plate having a spur toothed periphery and having a central stub shaft normal thereto slidably received in said shaft opening and thereby removably supporting said feed plate on said base structure for rotation about a central axis normal thereto with its toothed periphery controlling said material discharge opening, a feeder shaft extending through and rotatably supported by diametrically opposed portions of said hopper structure in axial alignment with said drive shaft and in overlying relation to said material discharge opening, a spur gear fixed to said feeder shaft for rotation therewith in meshed relation to the toothed peripheral portion of said feed plate controlling said material discharge opening, a coupling element supported by an opposed end portion of one of said shafts for rotation therewith and for limited movement axially thereof, said coupling element having a portion slidably engageable with the adjacent end portion of the other one of said shafts for establishing a driving connection therebetween, and yieldable means coacting with said coupling element to maintain same in driving engagement with said other shaft.

5. In a traveling support presenting a hopper attaching station adjacent one side thereof, the improvement comprising a hopper assembly pivotally secured to said station through means releasably retaining said assembly in an upright position and affording swinging movement thereof transversely outwardly with respect to said support and into an inverted position, said hopper assembly including a separable hopper structure and a material feeding mechanism comprising a feeder shaft rotatably supported by said hopper structure with an end of said shaft freely exposed for connection with the opposed end of a drive shaft, a drive shaft rotatably mounted on said traveling support with an end thereof disposed in adjacent axial alignment with respect to said exposed end of said feeder shaft when said hopper assembly is in said upright position, a coupling element supported by an adjacent end portion of one of said shafts for rotation therewith and for limited movement axially thereof, said coupling element having a portion slidably engageable with the adjacent end portion of the other one of said shafts for establishing a driving connection therebetween, and yieldable means coacting with said coupling element to maintain same in driving engagement with said other shaft.

6. In a traveling support presenting a pair of hopper attaching stations disposed in spaced transverse alignment with respect to the direction of travel, the improvement comprising a pair of hopper assemblies mounted on said stations and each including a base structure presenting a generally circular interior surface having a central axis generally normal thereto and a material discharge opening through a peripheral portion thereof and presenting similar spaced opposed station attaching portions rendering said assembly detachably pivotally securable to either one of said stations in an upright position with the same side of said assembly facing inward and with said assembly supported for selective swinging movement transversely outwardly about an axis generally parallel to the direction of travel and into an inverted position, said assemblies each including a material feeding mechanism comprising a circular feed plate freely removably supported on said base structure for rotation relative thereto about said central axis and comprising a feeder shaft rotatably supported with the inner end portions of the feeder shafts of said assemblies disposed in spaced axially aligned relation, a drive shaft rotatably supported by said traveling support in position between said hopper assemblies with its opposite ends in adjacent axially aligned relation to the opposed end portions of said feeder shafts when said hopper assemblies are in an upright position, said central axis intersecting the longitudinal axis of said drive shaft with a plane common to said intersecting axes passing through said material discharge opening, a pair of coupling elements mounted on opposite end portions of said drive shaft for rotation therewith and for limited movement axially thereof, said coupling elements each presenting an outer end portion slidably engageable with the opposed end portion of the adjacent feeder shaft for establishing a driving connection therebetween, and yieldable means coacting with said coupling elements to maintain same in driving engagement with said feeder shafts.

7. In a traveling support presenting a pair of hopper attaching stations disposed in spaced transverse alignment with respect to the direction of travel, the improvement comprising a drive shaft carried by said support in position between said stations and being mounted for rotation on a generally horizontal axis disposed transversely with respect to the direction of travel, a hopper assembly including a base structure presenting a generally circular interior surface having a material discharge opening through a peripheral portion thereof and having a central shaft receiving opening therethrough with its axis generally normal to said interior surface and presenting similar spaced opposed station attaching portions rendering said assembly detachably pivotally mountable on either one of said stations in an upright position with the same side of said assembly disposed in proximity to the adjacent end of said drive shaft and with said assembly supported for selective swinging movement transversely outwardly with respect to the adjacent end of said drive shaft about an axis generally parallel to the direction of travel and into an inverted position, said assembly being thus secured to a selected one of said stations and including a material feeding mechanism comprising a circular feed plate having a central stub shaft normal thereto slidably received in said shaft opening and thereby removably supporting said feed plate on said base structure for rotation about a central axis normal thereto and comprising a rotatably supported feeder shaft presenting a projecting end portion axially aligned with said drive shaft when said hopper assembly is in an upright position at either one of said stations, said central axis intersecting the longitudinal axis of said drive shaft with a plane common to said intersecting axes passing through said material discharge opening, a pair of coupling elements carried by opposite end portions of said drive shaft for rotation therewith and for limited movement axially thereof, said coupling elements each presenting an outer end portion slidably engageable with the projecting end portion of the feeder shaft presented by a hopper assembly mounted on the adjacent station, and yieldable means carried by said drive shaft and acting to maintain said coupling elements in driving engagement with the axially aligned projecting end portion of said feeder shaft.

8. In a traveling support mounting an elongated structure presenting a pair of hopper attaching stations disposed in spaced transversely aligned relation with respect to the direction of travel, the improvement comprising a pair of hopper assemblies mounted on said stations and each including a base structure presenting a generally circular interior surface having a central axis generally normal thereto and a material discharge opening through a peripheral portion thereof and presenting similar spaced opposed station attaching portions rendering said assembly detachably pivotally securable to either one of said stations in an upright position with the same side of said assembly facing inward and with said assembly supported for selective swinging movement transversely outwardly about an axis generally parallel to the direction of travel and into an inverted position, said assemblies each including a material feeding mechanism comprising a circular feed plate freely removably supported on said base structure for rotation about said central axis and comprising a feeder shaft carried by diametrically opposed portions of said assembly for rotation about an axis generally at a right angle to said central axis, a drive shaft rotatably supported by said elongated structure in position between said hopper assemblies with its opposite ends in adjacent axial alignment with respect to the opposite ends of said feeder shafts when said hopper assemblies are in an upright position, said central axis intersecting the longitudinal axis of said drive shaft with a plane common to said intersecting axes passing through said material discharge opening, a pair of coupling elements mounted on opposite ends of said drive shaft for rotation therewith and for limited movement axially thereof, said coupling elements each presenting an outer end portion slidably engageable with the opposed end of the adjacent feeder shaft for establishing a driving connection therebetween, and yieldable means carried by said drive shaft and acting to maintain said coupling elements in driving engagement with said feeder shafts.

9. In a traveling support mounting an elongated structure presenting a pair of hopper attaching stations disposed in spaced transversely aligned relation with respect to the direction of travel, the improvement comprising a pair of hopper assemblies mounted on said stations and each including a base structure presenting a generally circular interior surface having a central axis generally normal thereto and a material discharge opening through a peripheral portion thereof and presenting similar spaced opposed station attaching portions rendering said assembly detachably pivotally securable to either one of said stations in an upright position with the same side of said assembly facing inward and with said assembly supported for selective swinging movement transversely outwardly about an axis generally parallel to the direction of travel and into an inverted position, a hopper structure removably secured to said base structure for movement therewith, and a material feeding mechanism comprising a circular feed plate having a spur toothed periphery and being freely removably supported on said base structure for rotation relative thereto about said central axis and comprising a feeder shaft extending through and carried by diametrically opposed portions of said hopper structure for rotation about an axis generally at a right angle to said central axis, said feeder shaft having a spur gear fixed thereto for rotation therewith in meshed relation to the toothed periphery of said feed plate, a drive shaft rotatably supported by said elongated structure in position between said hopper assemblies with its opposite ends in adjacent axial alignment with respect to the opposite ends of said feeder shafts when said hopper assemblies are in an upright position, said central axis intersecting the longitudinal axis of said drive shaft with a plane common to said intersecting axes passing through said material discharge openings, a pair of coupling elements mounted on opposite ends of said drive shaft for rotation therewith and for limited movement axially thereof, said coupling elements each presenting an outer end portion slidably engageable with the opposed end of the adjacent feeder shaft for establishing a driving connection therebetween, and yieldable means carried by said drive shaft and acting to maintain said coupling elements in driving engagement with said feeder shafts.

10. In a traveling support presenting a pair of hopper mounting stations disposed adjacent opposite sides thereof in transversely aligned relation to the direction of travel, the improvement comprising a drive shaft carried by said support in position between said stations and being mounted for rotation on a generally horizontal axis disposed transversely with respect to the direction of travel, a pair of hopper assemblies each including a base structure detachably pivotally mounted on one of said stations in an upright position and supported for selective swinging movement transversely outwardly with respect to the adjacent side of said traveling support about an axis generally parallel to the direction of travel and into an inverted position, a hopper structure removably secured to said base structure for movement therewith, said base structure presenting a generally circular interior surface having a material discharge opening therethrough adjacent the periphery thereof and having a central shaft receiving opening extending therethrough with its axis generally normal to said interior surface and intersecting the longitudinal axis of said drive shaft with a plane common to said intersecting axes passing through said material discharge opening, a circular feed plate having a spur toothed periphery and having a central stub shaft normal thereto slidably received in said shaft opening and thereby removably supported for rotation over said interior surface about a central axis normal thereto with its toothed periphery controlling said material discharge opening, a feeder shaft extending through and carried by diametrically opposed portions of each of said hopper structures for rotation about a horizontal axis generally at a right angle to said central axis, said hopper structures when secured to said base structures each positioning its feeder shaft in spaced axial alignment with respect to the inner end of the feeder shaft of the other hopper structure and in end opposed axial alignment with said drive shaft, a spur gear fixed to each feeder shaft for rotation therewith in meshed relation to the underlying toothed periphery of said feed plate, and a shield structure disposed within said hopper structure in surrounding relation to said spur gear and forming a compartment wherein only those spur gear teeth in mesh with the toothed periphery of said feed plate are in contact with material confined in said hopper structure.

11. In a traveling support presenting a pair of hopper mounting stations disposed adjacent opposite sides of said support in spaced transverse relation to the direction of travel, the improvement comprising a drive shaft disposed transversely relative to the direction of travel with the ends thereof terminating adjacent said stations, a pair of hopper assemblies each including a base structure detachably pivotally mounted on one of said stations for selective swinging movement transversely outwardly with respect to the adjacent side of said traveling support about an axis generally parallel to the direction of travel and into an inverted position, a hopper structure removably secured to said base structure for movement therewith, said base structure presenting a generally circular interior surface having a material discharge opening therethrough adjacent the periphery thereof and presenting a depending central portion having a shaft receiving opening extending therethrough with its axis disposed centrally of and generally normal to said interior surface, a circular feed plate having a spur toothed periphery and having a central stub shaft normal thereto slidably received in said shaft opening, said feed plate being thus removably supported for rotation over said interior surface about an axis centrally thereof with its toothed periphery controlling said material discharge opening, a feeder shaft extending through diametrically opposed portions of said hopper structure and supported thereby for rotation about a horizontal axis generally at a right angle to said central axis and presenting an exposed exterior end portion disposed in end-opposed coupling relation with respect to the associated end of said drive shaft, said hopper structure when secured to said base structure positioning its feeder shaft in overlying relation to the associated material discharge opening, and a spur gear fixed to said feeder shaft for rotation therewith in meshed relation to the toothed periphery of said feed plate.

12. In a traveling support presenting a pair of hopper mounting stations disposed adjacent opposite sides of said support in spaced transverse relation to the direction of travel, a drive shaft disposed transversely relative to the direction of travel with the ends thereof terminating adjacent said stations, the improvement comprising a pair of hopper assemblies each including a base structure detachably pivotally mounted on one of said stations for selective swinging movement transversely outwardly with respect to the adjacent side of said traveling support about an axis generally parallel to the direction of travel and into an inverted position, a hopper structure removably secured to said base structure for movement therewith, said base structure presenting a generally circular interior surface having a pair of material discharge openings through diametrically opposed peripheral portions thereof and presenting a depending central portion having a shaft receiving opening extending therethrough with its axis disposed centrally of and generally normal to said interior surface, a circular feed plate having a spur toothed periphery and having a central stub shaft normal thereto slidably received in said shaft opening, said feed plate being thus removably supported for rotation over said interior surface about an axis centrally thereof with its toothed periphery controlling said material discharge openings, a feeder shaft extending through diametrically opposed portions of said hopper structure and supported thereby for rotation about a horizontal axis generally at a right angle to said central axis and presenting an exposed exterior end portion disposed in end-opposed coupling relation with respect to the associated end of said drive shaft, said hopper structure when secured to said base structure positioning its feeder shaft in overlying relation to the associated material discharge openings, and a spur gear fixed to said feeder shaft for rotation therewith in meshed relation to the toothed periphery of said feed plate.

13. In a traveling support presenting a hopper station disposed adjacent one side thereof, a drive shaft disposed transversely relative to the direction of travel with one end thereof terminating adjacent said station, a hopper assembly including a base structure detachably pivotally mounted on said station for selective swinging movement transversely outwardly with respect to said one end of the drive shaft about an axis generally parallel to the direction of travel and into an inverted position and including a hopper structure removably secured to said base structure for movement therewith, said base structure presenting a generally circular interior surface having a material discharge opening therethrough adjacent the periphery thereof and presenting a depending central portion having a shaft receiving opening extending therethrough with its axis generally normal to said interior surface, a circular feed pltae having a spur toothed periphery and having a central stub shaft normal thereto slidably received in said shaft opening, said feed plate being thus removably supported for rotation over said interior surface about an axis centrally thereof with its toothed periphery controlling said material discharge opening, a feeder shaft extending through diametrically opposed portions of said hopper structure and supported thereby for rotation about a horizontal axis generally at a right angle to said central vertical axis and presenting an exposed exterior end portion disposed in end-opposed coupling relation with respect to said one end of the drive shaft, said hopper when secured to said base structure positioning said feeder shaft in overlying relation to said material discharge opening, and a spur gear fixed to said feeder shaft for rotation therewith in meshed relation to the toothed periphery of said feed plate.

14. In a traveling support presenting a hopper station disposed adjacent one side thereof, a drive shaft disposed transversely relative to the direction of travel with one end thereof terminating adjacent said station, a hopper assembly including a base structure detachably pivotally mounted on said station for selective swinging movement transversely outwardly with respect to said one end of the drive shaft about an axis generally parallel to the direction of travel and into an inverted position and including a hopper structure removably secured to said base structure for movement therewith, said base structure presenting a generally circular interior surface having a pair of material discharge openings through diametrically opposed peripheral portions thereof and presenting a depending central portion having a shaft receiving opening extending therethrough with its axis disposed centrally of and generally normal to said interior surface, a circular feed plate having a spur toothed periphery and having a central stub shaft normal thereto slidably received in said shaft opening, said feed plate being thus removably supported for rotation over said interior surface about an axis centrally thereof with its toothed periphery controlling said material discharge openings, a feeder shaft extending through diametrically opposed portions of said hopper structures and supported thereby for rotation about a horizontal axis generally at a right angle to said central axis and presenting an exposed exterior end portion disposed in end-opposed coupling relation with respect to said one end of the drive shaft, said hopper structure when secured to said base structure positioning its feeder shaft in overlying relation to said material discharge openings, a first spur gear fixed to said feeder shaft for rotation therewith in meshed relation to a portion of the toothed periphery of said feed plate disposed over one of said discharge openings, and a second spur gear freely mounted on said feeder shaft for rotation in the opposite direction in meshed relation to a portion of the toothed periphery of said feed plate disposed over the other of said discharge openings.

15. A fertilizer attachment for a traveling support comprising a drive shaft disposed transversely relative to the direction of travel, a hopper assembly including a base structure detachably pivotally mountable on either side of such a support adjacent one end of said drive shaft for selective swinging movement transversely outwardly away from said end of the drive shaft about an axis generally parallel to the direction of travel and into an inverted position and including a hopper structure removably secured to said base structure for movement therewith, said base structure presenting a generally circular interior surface having a material discharge opening therethrough adjacent the periphery thereof and presenting a depending central portion having a shaft receiving opening extending therethrough with its axis generally normal to said interior surface, a circular feed plate having a spur toothed periphery and having a central stub shaft normal thereto slidably received in said shaft opening, said feed plate being thus removably supported for rotation over said interior surface about an axis centrally thereof with its toothed periphery controlling said material discharge opening, a feeder shaft extending through diametrically opposed portions of said hopper structure and supported thereby for rotation about a horizontal axis generally at a right angle to said central vertical axis and presenting an exposed exterior end portion disposed in end-opposed coupling relation with respect to said end of the drive shaft, said hopper when secured to said base structure positioning said feeder shaft in overlying relation to said material discharge opening, a spur gear fixed to said feeder shaft for rotation therewith in meshed relation to the toothed periphery of said feed plate, a shield structure disposed within said hopper structure in surrounding relation to said spur gear and forming a compartment wherein only those spur gear teeth in mesh with the toothed periphery of said feed plate are in contact with material confined in said hopper structure.

16. A fertilizer attachment for a traveling support comprising a drive shaft disposed transversely relative to the direction of travel, a hopper assembly including a base structure detachably pivotally mountable on either side of such a support adjacent one end of said drive shaft for selective swinging movement transversely outwardly away from said end of the drive shaft about an axis generally parallel to the direction of travel and into an inverted position and including a hopper structure removably secured to said base structure for movement therewith, said base structure presenting a generally circular interior surface having a material discharge opening therethrough adjacent the periphery thereof and having a central shaft receiving opening extending therethrough with its axis generally normal to said interior surface and presenting a pair of similar station attaching portions projecting from the exterior of said base structure in diametrically opposed relation with respect to each other and in symmetrical relation with respect to said central axis, a circular feed plate having a spur toothed periphery and having a central stub shaft normal thereto slidably received in said shaft opening, said feed plate being thus removably supported for rotation over said interior surface about an axis centrally thereof with its toothed periphery controlling said material discharge opening, a feeder shaft extending through diametrically opposed portions of said hopper structure and supported thereby for rotation about a horizontal axis generally at a right angle to said central axis and presenting an exposed exterior end portion disposed in end-opposed coupling relation with respect to said end of the drive shaft, said hopper when secured to said base structure positioning said feeder shaft in overlying relation to said material discharge opening, and a spur gear fixed to said feeder shaft for rotation therewith in meshed relation to the toothed periphery of said feed plate.

17. In a traveling support having a power transmitting shaft disposed in transverse relation to the direction of travel and having a hopper attaching station disposed outwardly adjacent each end of said shaft, the combination of a material dispenser comprising a hopper structure and a feeder shaft rotatably mounted on said hopper structure in a position presenting an end portion of said feeder shaft in transversely and outwardly extending relation to a side wall portion of said hopper structure, fastening means operable to selectively secure said material dispenser to said support in an operative position at one or the other of said attaching stations, said fastening means comprising a pair of similar exterior projections on said hopper structure at opposite sides, respectively, of a plane extending radially from and in the longitudinal direction of said feeder shaft, pivot means cooperable with one or the other of said projections and mountable on one or the other of said attaching stations so as to hinge said material dispenser at either of said attaching stations for swinging movement outwardly from said support and into an inverted position about an axis generally parallel to the direction of travel, and releasable locking means cooperable with one or the other of said projections and with one or the other of said attaching stations so as to secure said material dispenser in each of said operative positions thereof against said outward swinging movement; and releasable coupling means cooperable with said end portion of said feeder shaft and with one or the other end portion of said power transmitting shaft for selectively establishing and interrupting a driving connection between said power transmitting shaft and said feeder shaft.

18. A structure as recited in claim 17, wherein said pair of similar exterior projections are formed on and extend downwardly from a base portion of said hopper structure, and wherein said material dispenser further comprises a peripherally toothed, circular feed plate mounted on said base portion for rotation within said hopper structure in a plane below and generally parallel to the axis of said feeder shaft, and a gear element mounted on said feeder shaft for rotation therewith within said hopper structure and in cooperative engagement with the peripheral teeth of said feed plate.

AUGUST G. BUHR.

References Cited in the file of this patent

UNITED STATES PATENTS

| Number | Name | Date |
|---|---|---|
| 280,367 | Evans | July 3, 1883 |
| 792,620 | Ryan | June 20, 1905 |
| 950,086 | Wilson | Feb. 22, 1910 |
| 1,054,087 | Wilson | Nov. 19, 1912 |
| 1,397,689 | Krotz | Nov. 22, 1921 |